ELECTRORESPONSIVE RECORDING DEVICE

Filed June 19, 1958

WITNESSES:

Wm. C. Groome

James F. Young

INVENTOR

Carl J. Snyder.

BY C. L. Freedman

ATTORNEY

United States Patent Office 3,059,239

Patented Oct. 16, 1962

3,059,239

ELECTRORESPONSIVE RECORDING DEVICE

Carl J. Snyder, Raleigh, N.C., assignor to Westinghouse Electric Corporation, East Pittsburgh, Pa., a corporation of Pennsylvania Filed June 19, 1958, Ser. No. 743,030
6 Claims. (Cl. 346—74)

Figure 1:
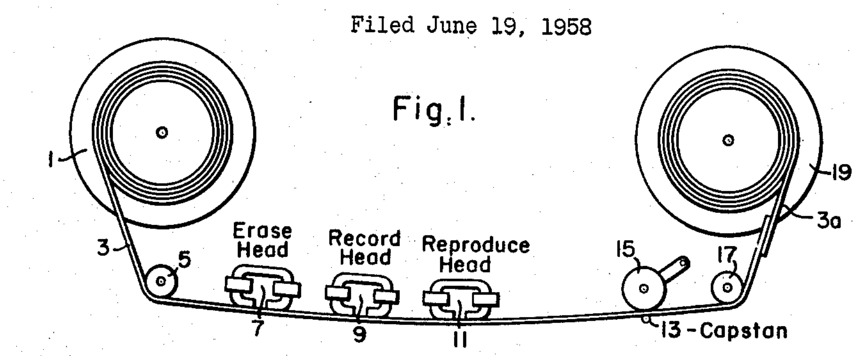

This invention relates to an electroresponsive recording device and has particular relation to a measuring device for producing magnetic records showing the relation of a measured quantity to time.

In many fields, it is desirable to provide a record of a measured quantity which shows the relationship of this measured quantity to time. For example, a study of the load distribution and consumption on electrical distribution systems requires a measuring device which measures a function of electric power supplied through the electrical distribution system and constructs a record showing the relationship of this measurement to time.

In the solution disclosed in the patent application of J. M. Wallace et al., Serial No. 619,584, filed October 31, 1956, and assigned to the same assignee, time information and measured information are magnetically recorded. As disclosed by Wallace et al., a magnetic tape is fed past a magnetic recording station at which a magnetic record can be formed in the magnetic tape. A common motor feeds the magnetic tape past the recording station and supplies time information to the station.

In some investigations, it is desirable to start a study of a record at a predetermined time. As a more specific example, the investigation may involve the study of a group of magnetic tapes each bearing a record each starting at the same time but obtained at a different point on an electrical distribution system.

In accordance with the invention, selectively-adjustable time-delay means are provided for the purpose of delaying production of a magnetic record in a magnetic member for a selected time. In a preferred embodiment of the invention, a magnetic tape similar to that utilized in the aforesaid Wallace et al. patent application is provided with a leader element which also may be in the form of tape. The leader element bears visible time markings indicating the time of delay from points on the leader element to the magnetic member or tape as the tape is fed past the magnetic recording station at which a magnetic record is formed in the magnetic tape. Thus, the leader element may be positioned relative to the said means to initiate the production of a magnetic record at a desired time.

It is therefore an object of the invention to provide improved apparatus for forming a magnetic record showing the relationship of a measured quantity relative to time.

It is also an object of the invention to provide a magnetic member for receiving a magnetic record which has associated therewith selectively-adjustable time-delay means for controlling the time of initiation of a magnetic record in the magnetic member.

It is an additional object of the invention to provide a magnetic tape for receiving a magnetic record therein which has a leader provided with a visible time scale.

It is a further object of the invention to provide magnetic recording equipment wherein a magnetic member has a leader associated therewith and is fed past a magnetic recording station, the leader being calibrated with visible time markings to indicate the time of travel from points on the leader to the associated magnetic member.

Figure 2:
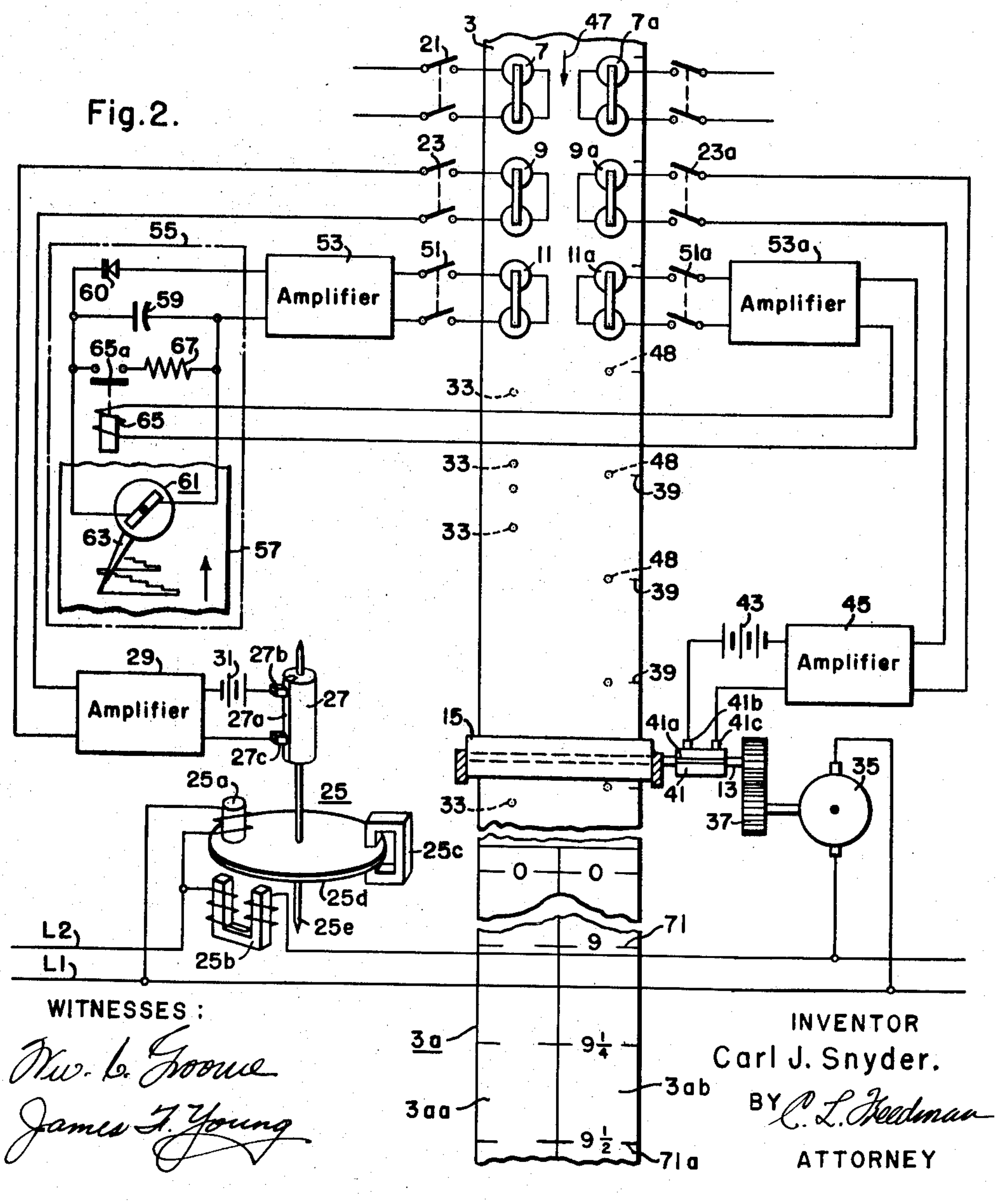

Other objects of the invention will be apparent from the following description taken in conjunction with the accompanying drawing in which:

FIGURE 1 is a schematic view of a magnetic recorder suitable for the invention; and FIG. 2 is a schematic view showing a portion of the recorder of FIG. 1 associated with components for supplying information thereto and components for utilizing information therefrom.

Referring to the drawing, FIG. 1 shows a magnetic recorder which may be of conventional construction. The recorder illustrated in FIG. 1 includes a payout reel 1 on which a flexible elongated magnetic member 3 may be wound. The magnetic member 3 may be of any suitable material capable of receiving and retaining a magnetic record therein. It may take the form of a flexible ribbon of magnetically-hard steel, but preferably it is in the form of a magnetic tape having a base constructed of a material such as paper or a plastic. The base is coated with a thin coating of magnetically-hard material. Such tapes are well known in the art.

The magnetic tape leaving the payout reel is guided in a predetermined path by means of a guide roller 5, an erase head 7, a record head 9, a reproduce head 11, a capstan 13 against which the tape is biased by means of a suitable biasing roller 15, and a guide roller 17 to a takeup reel 19. It will be understood that the various reels and rollers are mounted on a suitable supporting structure (not shown) for rotation about their respective axes.

The erase head 7 comprises an electromagnet which when energized establishes a magnetic field in the path through which the magnetic tape 3 passes. Thus, in one type of conventional magnetic recorder the erase head has its windings energized from an alternating source of current which may have a frequency of the order of 30,000 cycles per second. When the magnetic tape passes through the field produced by the erase head, any magnetic record previously applied to the tape is removed by the field.

The record head 9 also is in the form of an electromagnet for establishing a magnetic field in the path through which the magnetic tape moves. The windings of the electromagnet are energized in accordance with a quantity to be measured.

The reproduce head 11 is illustrated as another electromagnet similar to the record head. If the magnetic tape has a magnetic record therein, the movement of the tape past the reproduce head induces a voltage in the windings of the reproduce head which is representative of the magnetic record carried by the tape. The output of the windings may be supplied to suitable translating means in the manner hereinafter set forth.

The number of heads or electromagnets may be reduced by utilizing one of the heads for more than one function. For example, the record head also may be employed for reproduction purposes.

The capstan 13 is rotated at a substantially uniform rate for the purpose of advancing the magnetic tape past the heads at a substantially uniform rate. The takeup reel 19 is biased to take up the magnetic tape as it is fed by the capstan.

The structure illustrated in FIG. 1 and thus far described represents a magnetic recorder of conventional construction. For example, a magnetic recorder of this general type is discussed in a book entitled "Sound Recording" by John G. Frayne and Halley Wolfe, published by John Wiley & Sons, Inc. of New York city in 1949.

After the magnetic tape is fully wound on the takeup reel with a record therein, it may be rewound on the payout reel in a manner well understood in the art. The rewound magnetic tape then may be fed for a second time past the heads for the purpose of reproducing the record formed therein or if desired the magnetic tape may be removed for storage purposes.

FIGURE 2 shows a portion of the magnetic tape 3 together with the erase head 7, the record head 9 and the reproduce head 11. The erase head 7 may be connected through a suitable two-pole single-throw switch 21 to a high-frequency source of alternating current (not shown). It will be recalled that such a source may have a frequency of the order of 30,000 cycles per second.

The record head 9 may be connected through a two-pole single-throw switch 23 to a measuring unit 25 having an output representative of the quantity to be measured.

The unit 25 is responsive to power flowing in an electrical circuit represented by conductors L1 and L2. For example, this circuit may be a single-phase alternating-current circuit operating at a frequency of 60 cycles per second for the purpose of supplying power from a generator to a load. The unit 25 has a stator which includes an electromagnet providing a voltage pole **25*a* having a winding connected for energization in accordance with the voltage across the conductors L1 and L2. Current poles 25*b* are provided with windings connected for energization in accordance with current flowing in the conductor L2. A permanent magnet 25*c*** also forms part of the stator.

The unit 25 also includes a rotor represented by an electroconductive armature or disc **25*d* which is mounted for rotation relative to the stator on a shaft 25*e*. The armature 25*d* is positioned in the air gap of the electromagnet formed by the poles 25*a* and 25*b* and in the air gap of the permanent magnet 25*c*. The unit 25** thus takes the form of a conventional watthour meter and the rotor rotates at a rate dependent upon power flowing in the conductors L1 and L2.

The rotation of the shaft **25*e* is utilized to produce pulses occurring at a frequency dependent on the rate of rotation of the shaft. Mechanism for producing such pulses is well known in the art and is represented in FIG. 2 by a commutator 27. The commutator 27 may be constructed of an insulating material such as phenolic resin which is mounted on the shaft 25*e* for rotation therewith and which has an electroconductive bar 27*a* imbedded in its surface and extending parallel to the shaft 25*e*. Two brushes 27*b* and 27*c* are positioned to engage the commutator 27. It will be noted that these brushes are connected by the bar 27*a* once for each rotation of the shaft 25*e*. The brushes are connected to the input terminals of an amplifier 29 in series with a suitable source of voltage represented by a battery 31. The amplifier 29 may be utilized to amplify the pulse received from the battery 31 through the commutator 27, to provide a conventional bias if a bias is utilized in the recording process and to shape the pulse as desired. The output of the amplifier is connected to the record head 9 through the switch 23**.

From the foregoing discussion it is clear that as the shaft **25*e* rotates pulses are applied to the record head 9. Each of the pulses is magnetically recorded in the magnetic tape 3. Although such pulses are invisible to the eye, positions of representative pulses 33** are illustrated in FIG. 2. The spacing of the pulses depends substantially on the rate at which power is supplied by the conductors L1 and L2.

In order to feed the magnetic tape 3 past the heads the capstan 13 is coupled to a motive device such as an electric motor 35 through suitable coupling means 37. The electric motor 35 when energized is designed to operate at a substantially constant speed and may take the form of a conventional synchronous motor. By providing a suitable speed reduction in the coupling 37 the motor 35 may be of a reasonably high-speed type.

If the capstan 13 advances the magnetic tape 3 at a positively uniform rate, it follows that the tape may be provided with markings 39 representative of time. However, such precisely uniform movement of the tape is difficult to achieve with flexible magnetic tapes in a practical manner.

Timing signals are generated which are magnetically recorded in the magnetic tape 3. This eliminates the need for moving the magnetic tape in an absolutely uniform manner. If the type of timing signal adopted is such that the output of its magnetic record may be readily segregated from the magnetic record of the pulses supplied through the amplifier 29, as by suitable filters or discriminators, the timing signals may be applied to the magnetic head 9 to be recorded in a single track with the pulses supplied by the amplifier 29. However, in a preferred embodiment of the invention, a separate set of heads **7*a*, 9*a* and 11*a* are provided which correspond respectively to the heads 7, 9 and 11, but which apply a record to the magnetic tape lying in a track parallel to and spaced from the track containing the record represented by the pulse positions 33**.

The heads **7*a*, 9*a* and 11*a* may be spaced along the magnetic tape 3 from the heads 7, 9 and 11. This permits the adoption of a narrower magnetic tape with adequate mechanical room for the heads. However, it will be assumed that the pairs of heads 7 and 7*a*, 9 and 9*a* and 11 and 11*a*** are side by side.

The record head **9*a* may be energized through the switch 23*a* from any source capable of producing periodic pulses representative of time. In FIG. 2, the synchronous motor 35 employed for operating the capstan 13 also is employed for generating the timing signals. To this end a commutator 41 is mounted on the capstan 13 for rotation therewith. This commutator has a conductive bar 41*a* and is generally similar in construction to the commutator 27. Two brushes 41*b* and 41*c* engage the commutator and are connected by the bar 41*a* once for each rotation of the capstan 13. The brushes are connected in series with a suitable source of direct current such as a battery 43 across the input terminals of an amplifier 45. The amplifier may amplify the pulses produced by the commutator 41, provide a conventional recording bias if utilized for the pulses and shape them if so desired. The output of the amplifier is connected to the record head through the switch 23*a*. From the foregoing discussion it is clear that if the magnetic tape 3 is moved by the capstan 13 in the direction shown by the arrow 47, and if the switch 23*a* is closed, a series of pulses will be recorded in the magnetic tape 3. Although these pulses are invisible to the eye, their positions are represented in FIG. 2 by points 48**. It will be understood that each pair of successive points represents a definite period of time.

To illustrate suitable parameters for the various components, the magnetic tape may be of conventional construction having a width of ¼ inch. It may be moved past the recording heads at the rate of 2.35 inches for each rotation of the capstan 13. If the capstan is rotated once in each 15-minute interval, it follows that each pair of successive points 48 represents an interval of 15 minutes. With the parameters thus far discussed, a tape having a length of 600 feet is adequate for operation for a period of one month.

In operation, the magnetic recorder may be connected to the circuit represented by the conductors L1 and L2. After it has been placed in operation it may be left untouched for a period of one month. At the end of this period the magnetic tape may be removed for storage purposes or study and another magnetic tape may be loaded on the payout reel to permit operation for a succeeding month at the same location or at a different location as desired.

Although the magnetic tape may be run through a separate reproducing unit, it will be assumed that it is run through the same mechanism for reproduction purposes. During such reproduction the magnetic tape may be run at a speed substantially greater than the recording speed by suitable adjustment of the motor 35 and the coupling 37. This materially decreases the time required for reproduction. For reproduction the switches 51 and **51*a*** may be closed to connect the reproduce heads 11 and 11*a* respectively to the amplifiers 53 and 53*a*. The outputs of the amplifiers may be connected to any suitable translating equipment. In actual practice, the outputs of the amplifiers would be supplied to a business machine 55 of conventional construction for the purpose of converting the magnetic records stored in the magnetic tape 3 to cards in punched or printed form. Once the information has been transferred to cards, the magnetic tape 3 may be demagnetized for further use if so desired.

In order to simplify the present discussion, it will be assumed that the machine 55 is in the form of a recorder for applying to a chart 57 the information stored in the magnetic tape 3. To this end a capacitor 59 is connected across the output terminals of the amplifier 53. Consequently, each of the pulses 33 applied to the capacitor 59 through the amplifier 53 increases the charge on the capacitor and the voltage across the capacitor. If an alternating pulse is provided by the amplifier 53, a rectifier 60 may be connected in series with the capacitor 59 to supply unidirectional current to the capacitor. The voltage across the capacitor is measured by a suitable measuring device which is represented as a permanent-magnet moving-coil instrument 61 having a pen 63 mounted for movement across the chart 57.

The output of the amplifier 53*a* is supplied to a relay 65 having make contacts 65*a* which are connected in series with a resistor 67 across the capacitor 59.

Let it be assumed that as the magnetic tape moves along its appointed path one of the points 48 passes the reproduce head 11*a*. The resultant pickup of the reproduce head produces a pulse which is applied through the amplifier 53*a* to the relay 65 for the purpose of discharging the capacitor 59. Consequently, the pen 63 moves to its zero position. During the next time interval, each successive point 33 builds up a charge on the capacitor and increases the voltage across the capacitor. As the voltage increases, the instrument 61 moves the pen 63 across the face of the chart 57 to record a line representative of the voltage across the capacitor 59 and the demand occurring in the interval between successive points 48. When the next point 48 reaches the reproduce head 11*a*, the pen 63 again is reset to its zero position. It will be understood that the chart 57 is moved continuously. Consequently, a series of lines are produced on the chart 57 each of which represents the demand occurring during a 15-minute interval. In a practical device, a maximum of 150 pulses or points 33 may be produced within a 15-minute interval.

In accordance with the invention, selectively-adjustable time-delay means are provided for the purpose of initiating a magnetic record in the magnetic member 3 at a predetermined time. In a preferred embodiment of the invention, the time-delay means takes the form of a leader element 3*a* which extends from one end of the magnetic member 3. As shown in FIG. 2, the leader element 3*a* has time markings applied thereto. Thus, the marking 71 indicates that if the point 9 is placed adjacent the record head 9 and if the tape-driving means represented by the capstan 13 is placed in operation, nine hours must elapse before the magnetic member 3 reaches the record head 9. Thus, if the feed is started at 3 o'clock in the afternoon of a day, a magnetic record will be initiated at midnight.

As a further example, if the time marking 71*a* is placed adjacent the record head 9 and the feed means thereafter is placed in operation nine and one-half hours must elapse before the magnetic member 3 reaches the record head 9. Thus, if the time marking 71*a* is so positioned, and the feed means is then actuated at 2:30 in the afternoon of a day, a magnetic record will be initiated at midnight.

If the recording is to start at a definite time the leader element may be given time markings representing the actual time of day. Thus if midnight is the definite time, the time markings 71 and 71*a* may be labeled respectively 3 p.m. and 2:30 p.m., respectively.

Thus a cumulative time record is provided which indicates clearly at various points on the leader tape the time required to reach a recording point.

The leader element 3*a* has a length suitable to provide the range of adjustment required for any study. For example, the leader element may have a length sufficient to receive a time scale of 24 hours' duration. With such a time scale, the leader element may be so positioned that a feed means may be actuated at any time of the day to bring the magnetic member 3 to the record head 9 at midnight.

The leader 3*a* may be formed of the same material used for the magnetic member 3. In such a case, a discontinuity or a magnetized point which may be represented by the junction between the leader element and the magnetic member 3 may be employed for triggering the machine 55 to start operation at the desired time. However, in a preferred embodiment of the invention, the leader element 3*a* in its entirety or the portion bearing the time markings is of non-magnetic construction. If the magnetic member 3 is constructed of a non-magnetic paper or plastic base coated with a thin coating of magnetically hard material, the paper or plastic base may be employed for the leader element 3*a*, the thin coating of magnetically hard material being omitted from the portion of the base employed as the leader element. Alternatively, the leader element may be constructed of a separate non-magnetic tape which is suitably secured to the magnetic member 3 as by cement.

As previously pointed out, the entire leader element may be of a non-magnetic material and such a leader element has been found to be entirely satisfactory. However, as shown in FIG. 2, the leader element 3*a* may be divided into two portions 3*aa* and 3*ab* which extend along the length of the tape. One of the portions may be magnetic whereas the other portion is non-magnetic. Thus, the portion 3*aa* will be assumed to be magnetic whereas the portion 3*ab* is assumed to be non-magnetic. Such a leader element may be constructed by employing a paper or plastic base similar to that employed for the magnetic member 3 and coating only a portion of the paper with a thin coating of magnetically-hard material to form the magnetic portion 3*aa*.

By inspection of FIG. 2, it will be noted that the time markings or calibrated scale is applied to the non-magnetic portion 3*ab*. With such a construction, pulses 33 are applied to the leader element 3*a* during the movement of the leader element past the record head 9 and these pulses will be available for later study. However, the machine 55 can remain deactivated until the first point 48 reaches the reproduce head 11*a* to initiate a playback of the record. Consequently, with this construction, the production of the record on the chart 57 is effectively delayed for the time determined by the effective portion of the leader element 3*a*.

In order to illustrate the operation of the invention, let it be assumed that a study is to be made on two points on an electrical distribution system and that the study is to start at midnight of a certain day. Let it be assumed further that a workman carries two magnetic recorders of the type herein discussed to a first point on electrical distribution system and reaches this point at approximately 2:30 in the afternoon. The workman then positions the leader element of a first one of the magnetic recorders to place the timing marking 71*a* adjacent the record head 9 and starts the recorder in operation. Since the workman has selected a nine and one-half hour delay, it follows that a magnetic recording will be initiated at midnight of the same day.

The workman now proceeds to the second point to be studied and it is assumed that he reaches such point at 3 o'clock in the afternoon. The workman now installs his second magnetic recorder and positions the leader element of this record with the time marking 71 adjacent the record head 9 of such recorder. The workman now starts the second magnetic recorder in operation. Since he has selected a time delay of nine hours, it follows that the second magnetic recorder will initiate the production of a magnetic recording at midnight of the same day. Thus, he has coordinated the two magnetic recorders which he has installed. In analogous manners, a plurality of magnetic recorders may be installed with time delays as required by distribution systems which are to be studied.

Although the invention has been described with reference to certain specific embodiments thereof, numerous modifications falling within the spirit and scope of the invention are possible.

I claim as my invention:

1. In a recording unit for receiving a magnetic record when fed past a magnetic recording device, a magnetic member in a uniform magnetic condition throughout its extent for receiving a magnetic record therein, and a leader member secured to the magnetic member for movement therewith, the leader element having at least a portion of non-magnetic construction extending for a substantial distance from the magnetic member and having visible cumulative time markings thereon, whereby a portion of the leader element may be selected having a length sufficient to feed the magnetic member to a magnetic recording device after the expiration of a desired time.

2. In a recording unit for receiving a magnetic record when fed past a magnetic recording device, a flexible magnetic tape for receiving a magnetic record therein, and a flexible leader tape having a non-magnetic portion extending from one end of the magnetic tape for a substantial distance, the leader tape having visible time markings thereon disposed along the length of the leader tape to indicate the times of travel at a uniform rate of travel from points on the leader tape to the magnetic tape, whereby a portion of the leader tape may be selected having a length sufficient to feed the magnetic tape to a magnetic recording device after the expiration of a desired time.

3. In a recording unit for receiving a magnetic record when fed past a magnetic recording device, a flexible magnetic tape for receiving a magnetic record therein and a flexible leader tape extending from one end of the magnetic tape for a substantial distance, the leader tape having visible time markings thereon, said leader tape including a magnetic portion extending along the length of the leader tape for receiving a magnetic record therein, and a non-magnetic portion extending along the length of the leader tape, said non-magnetic portion having said time markings to indicate the times of travel at a uniform rate of travel from points on the leader tape to the magnetic tape, whereby a portion of the leader tape may be selected having a length sufficient to feed the magnetic tape to a magnetic recording device after the expiration of a desired time, said magnetic tape having first and second portions extending along the length of the tape and aligned respectively with said magnetic and non-magnetic portion of the leader tape.

4. In a recording equipment, a magnetic recorder device for producing magnetic records in a magnetic tape, said recorder device comprising a flexible tape, said tape including a magnetic tape section and a leader tape section extending from one end of the magnetic tape section for a substantial distance, feed means for feeding the flexible tape through a predetermined path substantially at a predetermined rate, and magnetic recording means adjacent said path for applying a magnetic record to the magnetic tape section, said leader tape section including a non-magnetic portion extending along the length of the leader tape section, and visible time marking on the non-magnetic portion for indicating the time of travel from points on the leader tape section to the magnetic tape section in response to operation of the feed means, whereby the leader tape section may be positioned relative to the feed means to feed the magnetic tape section to the magnetic recording means after the lapse of a predetermined time measured from actuation of the feed means.

5. In a recording equipment, a magnetic recorder device for producing magnetic records in a magnetic member, said recorder device comprising an elongated flexible recording unit, feed means for feeding the recording unit through a predetermined path substantially at a predetermined rate, and recording means adjacent said path for applying a record to the recording unit, said recording unit comprising a magnetic member for receiving a magnetic record therein and a leader element secured to one end of the magnetic member for movement therewith, said leader element extending from the magnetic member for a substantial distance and having a non-magnetic portions provided with visible time markings thereon for indicating the times of travel from points on the leader element to the magnetic member in response to operation of the feed means, said recording means when energized in accordance with a variable quantity being effective for applying a first magnetic record in the magnetic member representative of such variable quantity, and timing means for applying in the magnetic member a second magnetic record representing time.

6. In a recording equipment, a magnetic recorder device for producing magnetic records in a magnetic tape, said recorder device comprising a flexible tape, feed means for feeding the tape in the direction of the tape length through a predetermined path, said tape including a leader section divided along the tape length into a magnetic portion and a non-magnetic portion, said tape having a magnetic section including first and second magnetic portions following respectively the magnetic and non-magnetic portions of the leader section, said non-magnetic portion having visible time markings indicating the time required by the feed means to feed the tape from various points on the leader section to the magnetic section, recording means effective when energized for establishing a magnetizing field adjacent said path to apply a magnetic record in the magnetic portion of the leader section and the first magnetic portion of the magnetic section, and timing means for recording a magnetic time record in the second magnetic portion of the magnetic section as the feed means feeds the tape relative to the timing means through said path.

References Cited in the file of this patent

UNITED STATES PATENTS

| | | |
|---|---|---|
| 1,991,472 | Stern | Feb. 19, 1935 |
| 2,295,000 | Morse | Sept. 8, 1942 |
| 2,579,581 | Hustad | Dec. 25, 1951 |
| 2,615,989 | Thad | Oct. 28, 1952 |
| 2,764,639 | Holt | Sept. 25, 1956 |